July 29, 1969     J. R. DOUGLASS     3,458,065
HOPPER CAR SHAKER
Filed Jan. 24, 1967
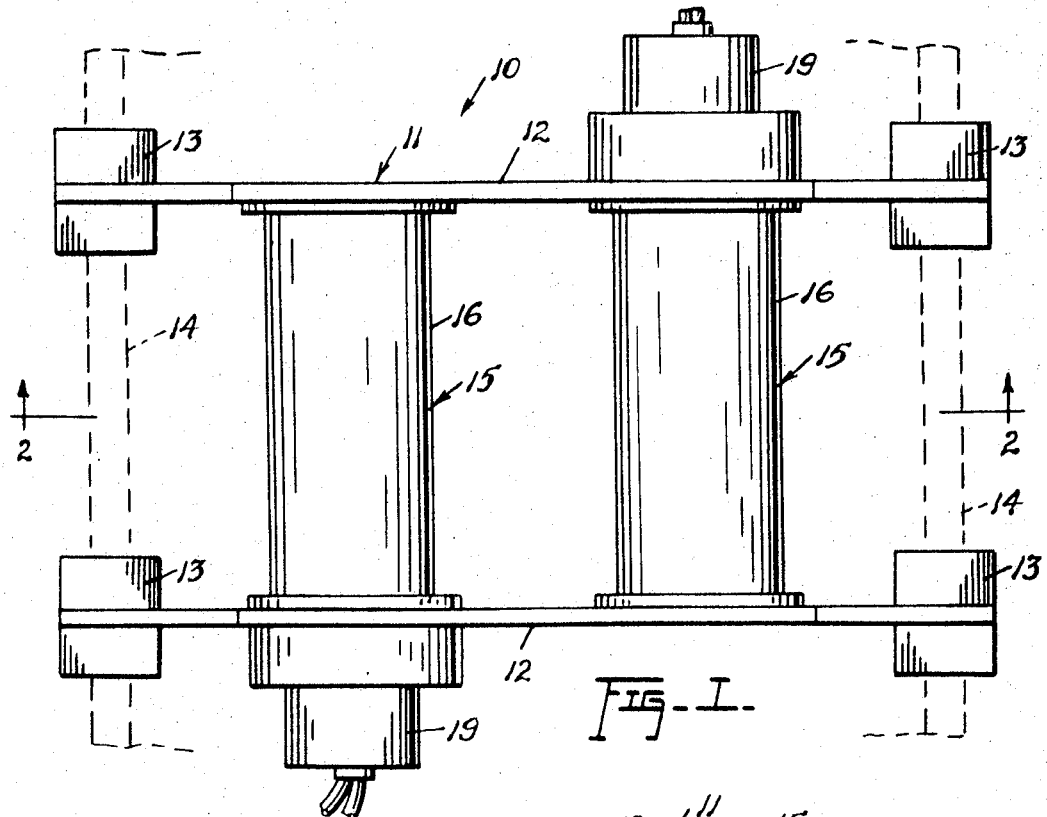
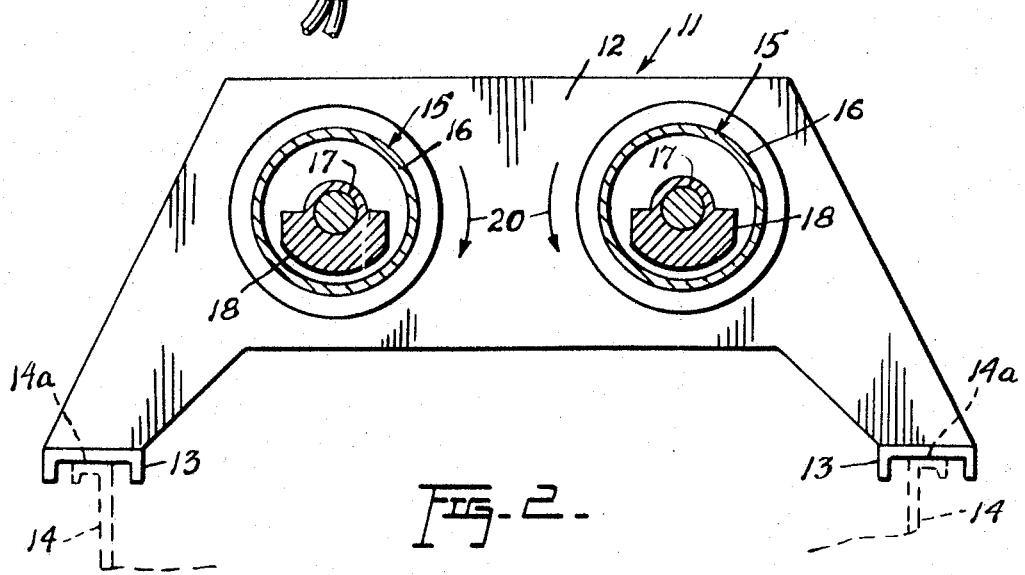
INVENTOR
James R. Douglass
BY *Munson H. Lane*
ATTORNEY United States Patent Office 3,458,065
Patented July 29, 1969

3,458,065
HOPPER CAR SHAKER
James R. Douglass, P.O. Box 155,
Duluth, Minn. 55801
Filed Jan. 24, 1967, Ser. No. 611,437
Int. Cl. B65g 67/24
U.S. Cl. 214—64.2                                   1 Claim

ABSTRACT OF THE DISCLOSURE

A frame seated on and extending between opposite side walls of a hopper car, the frame carrying a pair of eccentrically weighted parallel horizontal shafts which are synchronously rotated by individual motors in opposite directions. The weights travel together in a vertical direction to produce up and down vibratory pulses for shaking the car, but in a horizontal direction the weights travel opposite to each other so that their horizontal vibratory pulses are neutralized and lateral shaking of the car does not occur. The motors driving the two shafts are disposed at opposite sides of the frame to neutralize axial forces and thus prevent "walking" of the device along the side walls of the car.

---

This invention relates to new and useful improvements in so-called car shakers or devices for imparting vibration to hopper cars to effect or assist in effecting a discharge of the contents of such cars. Devices of this type usually employ a frame adapted to be seated on and extend between opposite side walls of the car, and a vibrator, usually in the form of an eccentrically weighted shaft, mounted in the frame and rotated by a suitable motor, so that vibrational pulses produced by the eccentrically weighted shaft are transmitted through the frame to the car for shaking the same.

While conventional car shakers of this general type are quite satisfactory for the purpose for which they are intended, that is, to effect or assist in effecting a discharge of the contents of the car, they nevertheless suffer several disadvantages. One of these is that the vibrational pulses or oscillations produced by the weighted shaft are effective in vertical as well as horizontal or lateral directions, with the result that the car is shaken upwardly and downwardly as well as laterally and is often subjected to damage by excessive vibration created by the component of multi-directional vibratory forces. By a similar token, a violently active shaker usually requires to be clamped or otherwise fastened on or to the side walls of the car in order to prevent its displacement from or shifting along the side walls, and such clamping or fastening means unduly add to the structural complexity and manufacturing cost of the device.

The present invention has as its principal object to avoid the disadvantages of conventional shakers as above outlined, this being attained by providing a very simple, economically practical shaker device which utilizes a pair of parallel, eccentrically weighted shafts rotating synchronously in relatively opposite directions so that their weights travel together vertically, but opposite to each other horizontally. As a result, the weights coact to produce up and down vibratory pulses for shaking the car, but their opposite horizontal pulses neutralize each other and lateral shaking of the car does not occur. Moreover, since the oscillations are in the vertical direction only, violent shaking does not arise to damage the car, and the device may be simply rested or seated on the side walls of the car to be effectively held in place by its own weight, so that mechanical clamping or fastening means are unnecessary.

As another of its features the invention provides separate motors for rotating the respective shafts, such motors being disposed at opposite sides of the frame in which the shafts are journalled so as to neutralize axial forces and thus prevent creeping or "walking" of the device along the side walls of the car.

Further still, rotation of the shafts by their respective individual motors is kept synchronized automatically by the inherent ability of the vibrational pulses to keep in phase, so that a mechanical synchronizing connection between the shafts, such as gearing, for example, is not required.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of the shaker of the invention in position on the side walls of a hopper car shown by dotted lines; and FIGURE 2 is a vertical sectional view, taken substantially in the plane of the line 2—2 in FIGURE 1.

Referring now to the accompanying drawings in detail, the hopper car shaker of the invention is designated generally by the reference numeral 10 and embodies in its construction an elongated frame 11 including a pair of arched side plates 12. The ends of these side plates have suitably secured thereto pairs of downwardly facing, channel-shaped pads 13 for seating the entire device on upper edges 14a of the opposite side walls 14 of a hopper car, it being understood that the device is effectively held in place by its own weight, without the use of clamping or other mechanical fastening thereof to the car.

The frame 11 carries a pair of spaced parallel vibrator units 15 extending horizontally at right angles to the longitudinal axis of the frame, or in other words, in parallel to the length of the hopper car. Each of the vibrator units 15 includes a tubular housing 16 suitably secured at its ends to the side plates 12 of the frame, in which respect the housings 16 of the two units may be regarded as components of the frame since they serve to connect the two plates 12 together without the use of frame cross members.

In any event, the housing 16 of each vibrator unit 15 provides bearings for a rotatable shaft 17 carrying an eccentric weight 18 within the housing, as will be apparent from FIG. 2. The respective shafts 17 of the two units 15 are rotated by individual motors 19, which may be electric but preferably are of the fluid (hydraulic) type. The motors are arranged to rotate the two shafts 17 in relatively opposite directions, as indicated by the arrows 20.

The rotation of the shafts is synchronized so that, for example starting with the position shown in FIG. 2 where the weights 18 are both at the bottom of the shafts, rotation of the shafts in opposite directions as indicated at 20 will cause both weights to simultaneously travel upwardly to the top of the shafts and then downwardly thus producing vibrational pulses or oscillations in a vertical direction, alternately up and down. These pulses are transmitted through the frame 11 to the hopper car for correspondingly shaking the same to discharge the contents thereof.

However, as the weights travel upwardly and downwardly, they also travel horizontally or laterally, but since the shafts rotate in opposite directions, the lateral vibrational pulses of the weights will always oppose and neutralize each other, so that no lateral vibration will be imparted to the car. Thus, violent vibration such as could damage the car will not arise, and effective car shaking action can be obtained by simply resting the device on the car by its own weight, without any mechanical clamping or fastening.

Also, the vibrational pulses produced by the two vibrators have an inherent ability to keep in phase, so that rotation of the two shafts is automatically synchronized without the necessity of mechanically connecting the shafts together, as for example by gearing.

What is claimed as new is:

1. A hopper car shaker comprising an elongated frame adapted to be seated on top edges of spaced opposite side walls of a hopper car while transversely spanning the space between said side walls, said frame comprising a pair of spaced side members provided at their ends with pads for seating the device upon said top edges of the side walls, a pair of spaced parallel vibrator units carried by said side members, each comprising a tubular housing mounted between said side members, and a pair of spaced parallel horizontal shafts each rotatably mounted in one of said tubular housings and extending substantially at right angles to the longitudinal axis of the frame, a pair of eccentric weights provided one on each of the respective shafts, and separate motor means independently rotating said shafts in opposite directions, rotation of the weighted shafts producing pulses automatically kept in phase to synchronize the shaft rotation without a mechanical driving connection between the shafts, said motor means comprising a pair of individual hydraulic motors connected to the respective shafts at the opposite sides of said frame.

References Cited

UNITED STATES PATENTS

| 2,471,849 | 5/1949 | Wallace | 74—61 X |
| 2,531,706 | 11/1950 | Signeul | 74—61 |
| 3,053,379 | 9/1962 | Roder et al. | 74—87X |
| 3,233,474 | 2/1966 | Ross et al. | 74—87 |

MILTON KAUFMAN, Primary Examiner

U.S. Cl. X.R.

74—61